April 17, 1934.   C. P. BROCKWAY   1,955,110
POWER TRANSMISSION SYSTEM
Original Filed June 15, 1921   3 Sheets-Sheet 1
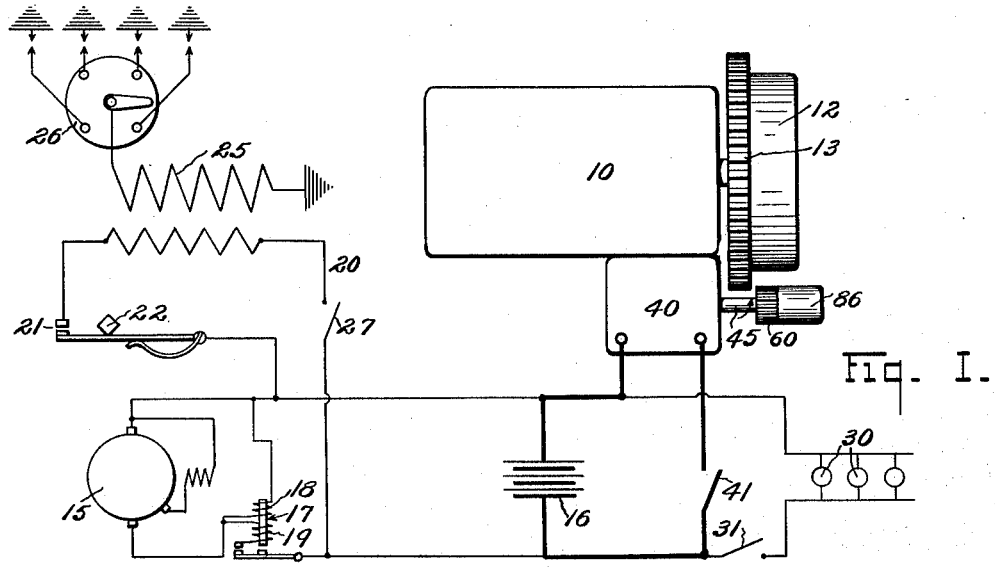
Fig. I.
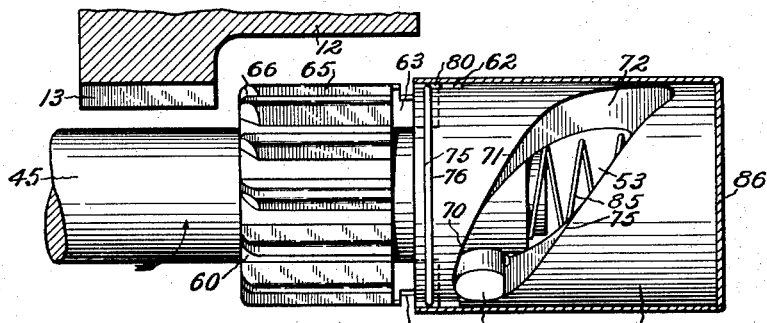
Fig. II.
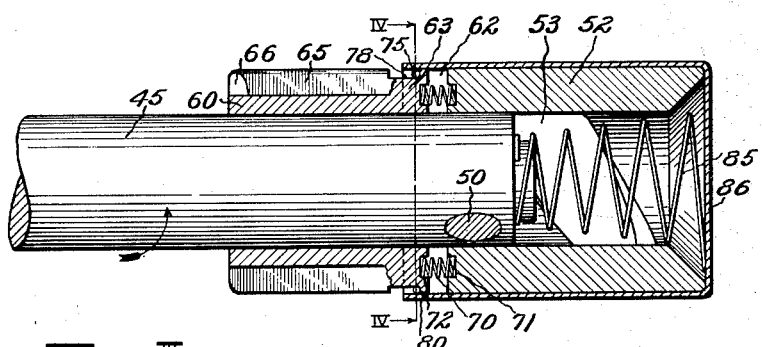
Fig. III.
INVENTOR.
Carl P. Brockway
BY Chester W. Braselton
ATTORNEY April 17, 1934.　　　C. P. BROCKWAY　　　1,955,110
POWER TRANSMISSION SYSTEM
Original Filed June 15, 1921　　3 Sheets-Sheet 2
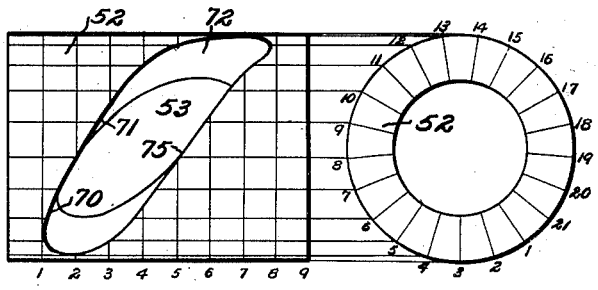
Fig. VI.
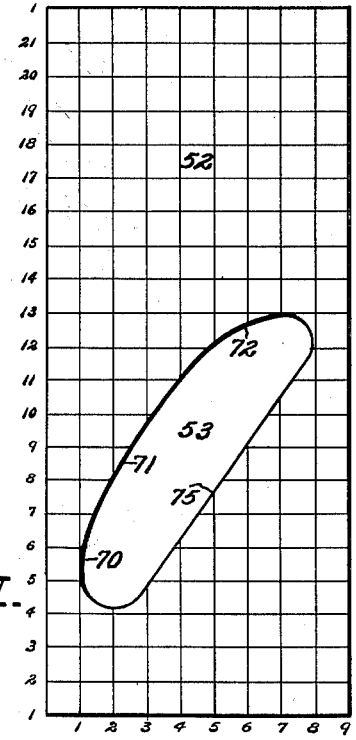
Fig. V.
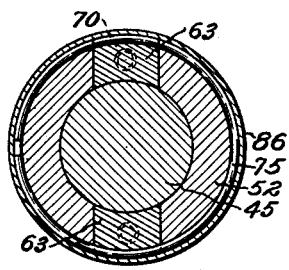
Fig. IV.
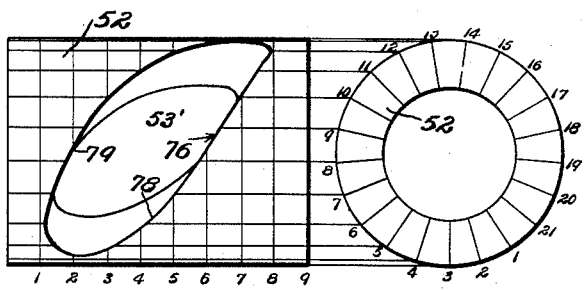
Fig. VIII.
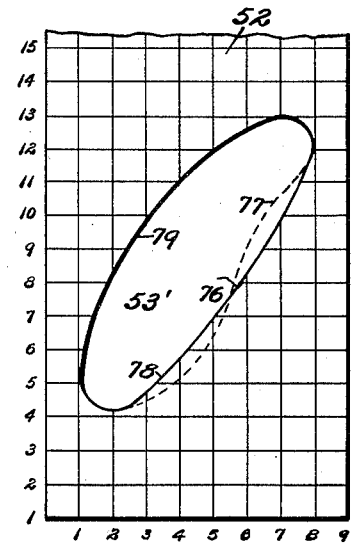
Fig. VII.
INVENTOR.
Carl P. Brockway
BY Chester W. Braselton
ATTORNEY April 17, 1934.  C. P. BROCKWAY  1,955,110
POWER TRANSMISSION SYSTEM
Original Filed June 15, 1921  3 Sheets-Sheet 3
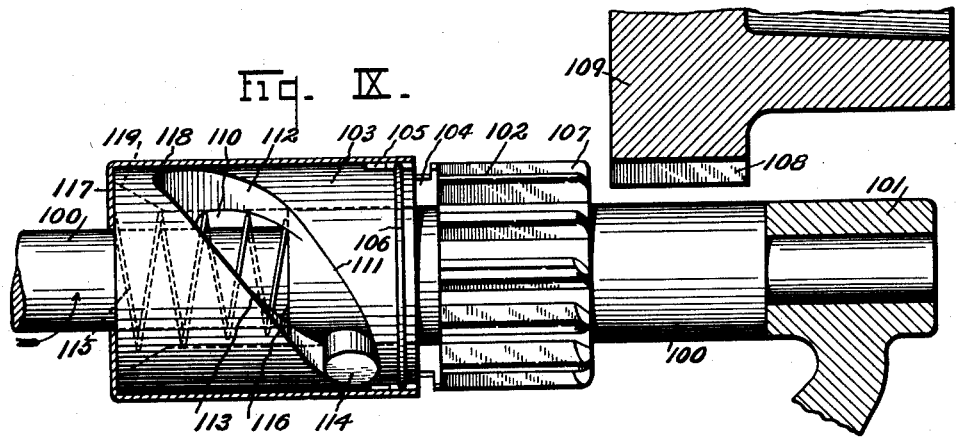
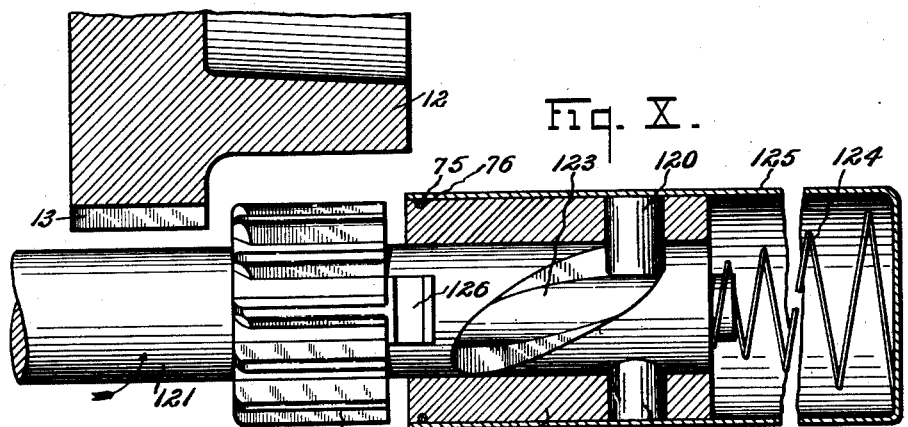
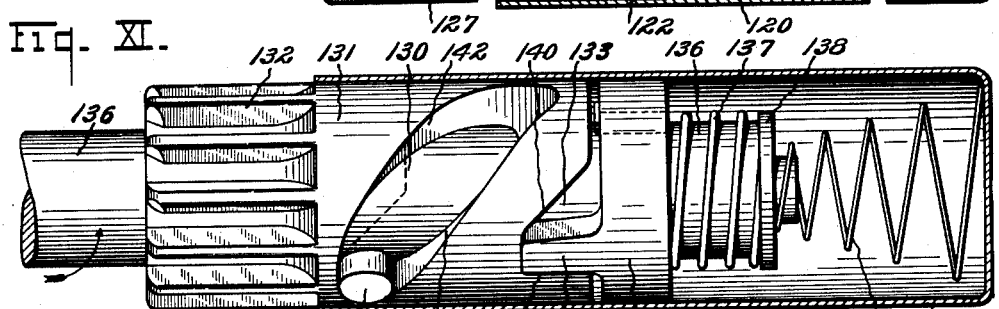
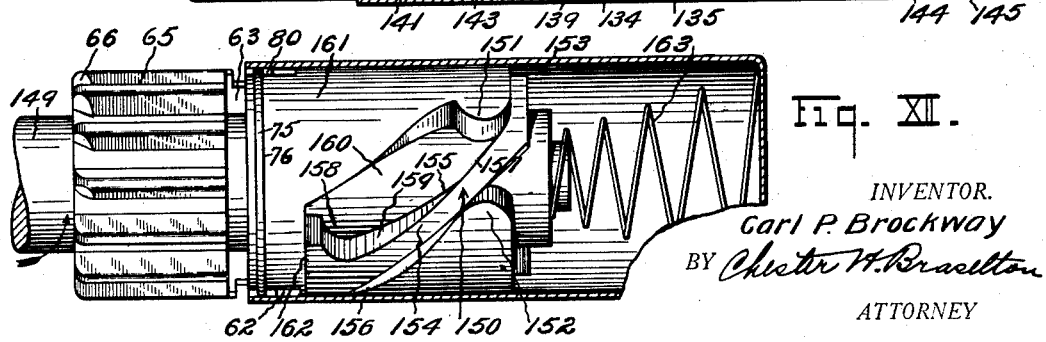
INVENTOR.
Carl P. Brockway
BY Chester H. Braselton
ATTORNEY Patented Apr. 17, 1934

1,955,110

UNITED STATES PATENT OFFICE 1,955,110

POWER TRANSMISSION SYSTEM

Carl P. Brockway, Paterson, N. J., assignor to Industrial Research Corporation, Toledo, Ohio, a corporation of Delaware Application June 15, 1921, Serial No. 477,612
Renewed December 2, 1930

7 Claims. (Cl. 74—7)

This invention relates to a system of power transmission including a connecting and disconnecting mechanism adapted for use as a starting system as applied to an internal combustion engine with specific utility in connection with automobiles, having, however, a wide range of utility as a system wherever means are to be provided for automatically connecting and disconnecting a train of power transmission, particularly where it is desired to mesh and de-mesh co-operating gear elements.

One of the main objects of the invention is to provide a novel system and mechanism which transfers power from a motor, for example, or other source of power, to an engine or other load or mechanism to be operated from said source, the mechanism being normally disconnected or initially disconnected, but operative to be moved into a driving connection in such a manner as to properly establish a driving relation and variably build up a rotational torque or force developed from the motor or other source of power to transfer the same to the engine or member to be started, or actuated, proportional to the resistance or inertia against starting to effect a full driving transmission of torque as the connection is established, and move the stationary member without severe strain or shock, or an object of the invention is to provide a novel arrangement of mechanism for transmitting power in which the motor or source of power is operative to establish a driving connection and the mechanism is arranged to progressively increase the resistance against rotational movement of one of the connecting elements, by applying the load in gradual or varying increments as the connection is being established, or in one specific embodiment or illustration thereof, to provide such connecting and disconnecting mechanism between a rotating source of power and an engine or member to be actuated which advances an element into driving connection with the element to be rotated and at the same time, effects a resistance against rotation in such a manner as to gradually transfer the power of the motor or source operating to advance the element— to rotative torque which will actuate the engine or other element to be rotated.

More specifically, one embodiment of my invention is illustrated as an automatic connecting and disconnecting mechanism between the starting motor and the fly wheel of a gas engine, in which a pinion is caused to advance into mesh with the fly wheel in such a manner as to gradually increase the resistance against advancing the pinion and gradually builds up a starting torque to transmit the rotative motion of the starting motor to the fly wheel as the enmeshment is effected, without excessive strain or shock to the operative elements of the mechanism.

Moreover, this invention also includes a construction which operates to disconnect the driving relation when the actuated member starts, or revolves more rapidly than an element in the driving connection, and the mechanism may be provided with or arranged or constructed to constitute means for also regulating the disconnecting action so as, for example, to facilitate the initiation of the disconnecting operation, and also change the application of the disconnecting force so as to tend to decrease the disconnecting action at the end of the disconnecting operation.

A further object is to provide a construction of the character indicated, which effects a positive drive connection between the motor or starting source of power and the element to be actuated, to thereby increase the efficiency of power transmission.

A further object is to provide, if desired, such a construction of the character indicated as will effect a drive connection before the motor or starting source of power has attained too appreciable a speed, or such speed as might otherwise increase the shock of impact and consequent wear and possible breakage.

The invention also has for an object to provide a construction of the character indicated in which, when the connection is established, the same is not subject to slippage brought about by wear.

Moreover, an important feature of the invention is to provide a novel system including co-operating connecting and disconnecting mechanism and motor or source of power constructed to constantly apply a rotative force regardless of variations of load, for example, as when the engine goes over the compression points, and thus maintain the disconnectible mechanism always in connectible relation until the engine has started under its own power.

A further object of the invention in certain embodiments thereof, is to provide in an arrangement of the character indicated, means to facilitate the initial enmeshment of two co-operating gear parts in the connecting mechanism, and the parts may be so arranged as to reduce to a minimum the hammer-blow effect of the pinion upon enmeshment with the gear with which it is being connected.

Moreover, an object of the invention is to provide a novel mechanism for transferring power to a load as from a starting motor to an engine to be started by mechanism connecting the same, without the use of intermediary yielding or spring connections in the train of power transmission to absorb strains or shocks or otherwise facilitate action of the apparatus.

In addition to the objects indicated, the present invention has a wide range of utility of general application and is by no means limited as to any of the specific uses which are illustrated herein by way of example, and in which the several co-operating features of the invention have a particularly advantageous use.

Further objects relating to the various specific constructions will appear from the description of certain embodiments thereof, illustrated in the accompanying drawings, in which:

Figure I shows an embodiment of the invention as a system for starting a gas engine with a certain type of electrical equipment associated therewith.

Figure II is an elevation of the one embodiment of connecting and disconnecting mechanism.

Figure III is a sectional view corresponding to Figure II.

Figure IV is a sectional view on the line IV—IV of Figure III.

Figures V, VI, VII and VIII represent diagrammatically the development of a form of slot used in the mechanism shown in Figures II to IV, the form illustrated in Figures VII and VIII being a modification of the slot shown in Figures V and VI.

Figure IX is a view similar to Figure II showing a mechanism applied to an outboard movement.

Figure X is a view similar to Figure II showing a reversal of the parts, particularly of the pin and slot connection.

Figure XI is a view showing a modified type of mechanism; and

Figure XII is a view a another modified form.

Referring to Figure I, there is illustrated therein a two-unit starting, generating and ignition system adapted for use with an internal combustion engine, a mutiple cylinder engine being illustrated at 10, having a fly-wheel 12, the periphery of which is provided with gear-teeth 13. A generator 15 is diagrammatically illustrated and is intended to be driven from the engine to charge a battery 16 adapted to be connected therewith by an automatic switch 17. This switch is of the voltage type and includes a shunt voltage coil 18 and a series coil 19 both coils being wound on the same core and adapted to close the armature switch in the main battery generator circuit. By means of this automatic switch the main circuit from generator to battery is not closed until the generator has acquired sufficient voltage to prevent a discharge from the battery to the generator thus avoiding unnecessary depletion thereof. An ignition circuit for the engine includes a primary circuit 20, having a make and break 21 actuated by an engine driven part 22, the secondary circuit including the winding 25 and a distributor mechanism 26 for the several cylinders of the engine 10. A switch 27 may be provided to control the ignition circuit. Lights 30 are illustrated in circuit with the battery and generator and controlled by a switch 31.

The embodiment of the present invention illustrated herein is adapted for use for starting the engine 10, and to this end there is provided a series wound electric motor 40 being connected in circuit with the battery 16 and having a suitable switch 41 to control such circuit. The motor 40 is provided with a shaft 45 upon which is mounted the connecting and disconnecting mechanism forming an essential element of the present embodiment of the invention.

This mechanism is arranged so that when current is supplied to the motor 40, a suitable driving gear will be moved into mesh with the gear 13 on the flywheel 12 of the engine in such a manner as to assume the load of the flywheel and connected parts without undue strain, and to be disconnected therefrom when the engine operates under its own power. One embodiment of the connecting and disconnecting mechanism is illustrated in Figures II, III, IV, V and VI, wherein the motor-shaft 45 is shown as provided with a pin 50 which is intended to form a power transmitting means between the shaft and the element which is moved into driving relation with the fly-wheel and rotated to start the engine. In Figure II there is illustrated an extension of the pinion 60 in the form of a sleeve 52 on the shaft 45 provided with a slot 53 to receive the pin 50. A particular slot is shown developed in Figure V and transferred upon a cylinder surface in Figure VI, which represents specifically one shape of slot which, when applied to a member 52 of the dimensions shown, will accomplish the results stated in the objects of the invention, but it is to be understood that the slot shown in Figure V may be greatly varied into an infinite number of shapes to meet the operating conditions in which the invention is to be used, or depending upon the results desired. The sleeve 52 has a driving connection with the pinion 60 which is shown in Figures II, III and IV as including a plurality of notches 62 in the sleeve 52 into which project co-operating tongues 63 carried by the pinion 60. The engaging edges of the teeth 65 of the pinion are perfectly beveled as shown at 66 to facilitate enmeshment, as will be evident.

The pinion and sleeve shown in Figures II and III are arranged to provide a relative longitudinal movement to afford a capacity for proper movement of the pinion relative to the driving shaft upon initial enmeshment of the gears, and to this end, there is shown in Figure III, suitable coil springs 70 suitably retained in recesses 71 and 72 in the sleeve 52 and pinion 60 respectively.

There is also illustrated in this embodiment of the invention, means to maintain the pinion 60 against a movement entirely away from the sleeve 52, and a suitable means therefor is a ring 75 adapted to fit perfectly in the groove 76 of the sleeve 52 and to engage in a cut-away portion 78 on the tongues 63 connected with the pinion. This forms an overhanging lip 80, which engages the ring 75 in the normal position of the pinion extended from the sleeve 52, the ring and lip limiting further movement thereof.

If desired, a relatively light spring may be interposed between the shaft 45 and the movable gear elements for preventing longitudinal movement of the pinion or gearing parts, unless properly actuated from the shaft 45. Thus the spring 85 bears at one end against the shaft 45, and at the other engages an over-hanging cap 86 which is suitably connected with the sleeve 52 in any desired manner.

The slot 53 is formed to give an advancing pitch drive between the shaft and the movable element of the power transmitting mechanism, and is so designed as to advance the pinion 60 into mesh with the fly-wheel gear 13, the first action by reason of the portion 70 of the curved slot 53, moving the pinion 60 longitudinally, and then by reason of the innumerable successive portions such as 70 and 71, 72 etc. of the slot, the power transmitted from the shaft diminishes the component of force moving the pinion longitudinally and increases the component of force or torque for rotating the pinion, the resistance of the load as assumed being encountered and applied to the driving mechanism by reason of the engaging gear-teeth, the curve of the slot 53 in the particular embodiment shown more rapidly changing at the portion 71 adjacent the end of the travel of the pinion 60, and the pinion eventually receiving a positive rotational driving action from the shaft when the pin 50 reaches the proper extreme of the slot 53 as at the portion 72, and the component of force developed by the rotation of the shaft 45 transmits the entire power thereof to rotating the pinion as a positive driving relation and consequently starting the fly-wheel of the engine.

When the engine starts under its own power, or the actuated member attains a certain speed, the reverse action through the pin and slot wholly disengages the gearing connection. In Figure V the return actuating portion of the slot 53 as illustrated at 75 is made substantially straight, whereas 53' in Figure VII, portion 76 is curved as may be desired, the dotted curvature 77 giving certain advantages in the quick initiation of the return movement, or a diminishing in the return action toward the end thereof, and the full line curvature 78 giving a slower initial return movement followed by an accellerated concluding movement, the first arrangement giving an advantage in preventing jar of impact in demeshing and second arrangement preventing too great an acceleration to the demeshing pinion at the starting of the engine. The driving edge 79 of the slot 53' shows a slightly modified curvature over that of 77 described with reference to Figure V.

Referring now to Figure IX of the drawings there is illustrated a preferred form of my invention as applied to the shaft wherein there is outboard movement of the meshing pinion as distinguished from inboard movement, these terms being applied to types of motor driven mechanism where the driving pinion moves toward the motor into operative position or out from the motor depending upon the mechanical requirements of the installation.

The motor shaft 100 in this arrangement is supported at its outer end by a bracket bearing 101 which in turn is secured either to the engine or motor frame. The drive mechanism includes the pinion 102 and sleeve member 103 inter-connected as described previously with reference to Figure II by means of projecting tongues 104 on the pinion 102 interengaging in notches 105 formed on the end of the sleeve. Similarly, as indicated in the preferred form, the interengaging tongues in both pinion and sleeve members are annularly channeled to receive a circumferentially placed wire 106 the diameter of which is less than that of the width of the channel thereby permitting relative axial movement of sleeve and pinion. As previously described also the engaging ends of the gear teeth 107 are rounded and chamfered for the purpose of permitting ready engagement with teeth 108 of the flywheel 109. The sleeve 103 is formed with the slot 110 extending angularly as shown, with the driving edge 111 being formed with a progressively curved contour for the purpose of taking up the shock of meshing as previously indicated, the edge having its maximum curvature at the point 112 adjacent the final driving position. Also there is shown the disengaging or opposite edge of the slot 113 with an approximately regular curvature though in some instances an irregular curvature as indicated in Figure VII whereby an accelerated movement or disengagement may be obtained, may be employed.

The driving pin 114 within the slot 110 is normally maintained in the disengaged position of the slot by means of a yielding spring member 115 one end of which bears against a shoulder 116 formed on the shaft and the other end contacting against the inturned flange 117 of an enclosing cap member 118 which cap member extends completely over the cylinder 103. To permit expansion of the spring the end of the cylinder adjacent the flange 117 is flared as indicated at 119.

The operation of this form of mechanism is identical to that described with reference to Figures II, III and IV in that rotation of the shaft as indicated by the arrow causes the pin 114 to travel along the engaging edge 111 of the sleeve slot moving the pinion into mesh, and in that subsequent starting of the engine, with the acceleration of the fly-wheel 109, cams out the pinion by contact of the pin 114 with the camming edge 113 of the slot.

In Figure X I have illustrated an embodiment of my invention of the inboard type wherein the driving pins 120 instead of being fixed to the driving shaft 121 are secured to the sleeve 122 projecting inwardly against the walls of the slot 123 cut in the surface of the motor shaft itself. In other words this modification shows a re-arrangement of the pin and slot connection between the shaft and driving sleeve, differing from the preferred form in that the pin and slot are interchanged, this modification being advantageous in some installations. Other details of this modification such as the spring member 124 for holding the mechanism normally out of engagement, the cap member 125 against which the spring has yielding engagement and the relatively movable interchanging projections 126 designed to permit relative movement between the sleeve 122 and pinion 127 are analogous to similar features in the preferred form.

Figure XI discloses a further modification of the essential idea of my invention. In this disclosure the slot 130 instead of being formed in a sleeve separate from the pinion is formed on a sleeve 131 integral with the pinion 132. In addition the sleeve 131 is formed with the notch 133 in the outer end thereof which is adapted to contact with the projection 134 integral with an annular ring 135 which latter ring is splined to the shaft 136 in such a manner as to permit relative axial movement thereto but prevent relative rotational movement, as shown in Figure XI, the coil spring 137 bearing against a stop 138 on the end of the shaft, and against the ring 135 and tending to hold the ring with its projection 134 seated normally at the bottom of the notch 133 in the sleeve while at the same time permitting yielding movement of the ring in the outward direction. One side 139 of the notch is parallel to the shaft axis but the opposite side 140 is inclined at an angle to this axis, this angle being as shown in the drawings approximately 45 degrees though the exact degree of angularity is immaterial within certain limits.

The pin and slot connection is similar to the forms illustrated and described with reference to Figures II and IX in that a pin 141 through rotation of the shaft moves in the slot along a drive surface 142 of a curvature which constantly approaches a tangent parallel to the shaft and in that the disengaging camming surface 143 against which the pin bears when the engine starts up and drives the pinion, disengages the same from the fly-wheel gear. A spring 144 contacting at one end against the end of the drive shaft 136 and at the other end against a cap 145 fixed to the sleeve is adapted to normally maintain the pinion in disengaged position with the pin 141 positioned as indicated in the drawings.

In the initial operation of this form of mechanism when the shaft is rotated as indicated by the arrow the projection 134 rides up the inclined edge 140 of the notch 133 by virtue of the inertia of the sleeve and pinion member. During this movement the pin 141 moves parallel to the camming surfaces 140 as indicated in dotted line until the projection rides out of the notch 133 upon the plane end of the sleeve. Thereupon the pin moves parallel to this plane end into engagement with the curved driving surface 142 of the notch and power is thereinafter transmitted directly from the pin to the sleeve and pinion. The specific object in utilizing the notch and projection in bringing about the initial meshing operation is to provide for the case wherein the pinion teeth in moving laterally toward the engine gear teeth contact with the same failing to make proper engagement. When this occurs the sleeve no longer is moved toward the engine gear so in consequence the projection rides out toward the end of the shaft against the pressure of the spring 137 due to the continued rotation of the drive shaft 136. A very small degree of rotation is necessary before the pinion teeth ride past the ends of the engine gear teeth and slip into proper engagement, this action being accelerated by the expansive force of spring 137. It is obvious that if this notch and projection arrangement are not provided there would be no yielding characteristics in case the teeth failed to mesh properly and breakage of the drive mechanism would inevitably result in the case of improper engagement.

The previously described forms of my invention consider the utilization only of a pinion and slot connection in the drive mechanism it being immaterial whether or not the slot be in either the drive or the sleeve. It is within the scope of my invention, however, to include a laterally engaging arrangement, Fig. XII, wherein for the pin is substituted a clutch member 150 preferably formed integral with the shaft 149 which member is adapted to operatively engage with contacting members 151 and 152 cut in a sleeve. The clutch member 150 is placed toward the end of the drive shaft and at its outer end is formed as a radial projection 153 which merges into a camming projection 154 with two camming surfaces the upper surface 155 being the driving surface and the lower surface 156 being the disengaging surface. The curvature of the driving surface 155 is similar to the driving surfaces herein before described in that it is formed with an initial curvature 157 having an inclination whose tangent approaches a plane transverse to the driving shaft and a final curvature 158 approaching a plane parallel to the shaft axis, the curvature changing most rapidly at the point 159 adjacent the final driving point 158 of the surface. The projections 151 and 152 are positioned at the mouth of a notch 160 cut in the sleeve 161 so as to open in an outward direction toward the end of the shaft and extend in a general direction approximately parallel to the axis of the camming member 154. The depth of this notch is such that when the inner end 162 of the member 150 contacts against the base of the notch 160 the pinion is in disengaged position relative to the engine gear.

In the operation of this form of mechanism reference to Figure XII discloses the fact that in disengaged position as therein shown the camming element 151 is at the extreme outer slope of the camming member 154 and that the projection 152 is positioned adjacent the camming surface 156 of the member 154 with the parts as illustrated. When the shaft rotates as indicated by the arrow, the member 154 is forced against the element 151 and due to the inclined slope of the driving surface 155 the sleeve member is moved inwardly carrying with it the driving pinion. Meshing accordingly takes place and rotational force of the shaft is gradually transferred through the curved surfaces 159 of the drive 154 until the gears are completely in mesh and full power is transmitted in the driving operation. When the engine gear at starting drives the pinion the surface 156 of the camming element 154 cams the sleeve and pinion members completely out of mesh this movement being aided by the spring 163.

It should be particularly noted that in the preferred form of my invention, as provided in the relatively slidable sleeve and pinion, as well as in the modifications, means for preventing breaking due to failure of the teeth to mesh are provided thereby increasing the efficiency and operativeness of the mechanism.

Having thus described my invention, what I claim as new and desire to secure by Letters Patent, is:

1. In a mechanism of the character described, the combination of a shaft; a slotted sleeve member axially and rotatively movable on the shaft; a pin fixed to the shaft and movable within the slot; said slot having two oppositely positioned curved camming surfaces adapted to contact with said pin, said pin being adapted to move the sleeve axially with a negatively accelerated speed when forced against one of said surfaces and to move said sleeve axially with more uniform speed in the opposite direction when forced against the other of said cam surfaces.

2. In a drive mechanism, in combination, a driven member, a drive member adapted to engage and drive said driven member but normally out of engagement therewith; a drive shaft upon which said drive member is mounted for both rotary and axial movement relative thereto, a sleeve having a slot formed therein positioned on said shaft and slidably connected to said drive member, a pin on said shaft adapted to co-operate with the sleeve through said slot, said slot having a general angular inclination in the direction of shaft rotation, whereby rotation of the shaft relative to the sleeve will advance the drive member into engagement with the driven member, when the drive shaft is energized, and the pin contacting wall of said slot having a curvature such that the tangent to the slot at the point of pin contact when the drive member is in disconnected position is approximately parallel to a transverse plane through the drive shaft, and the tangent to the slot at the point of pin contact when the drive member is in connected position is approximately parallel to the drive shaft axis.

3. In a starting mechanism for engines, the combination of an engine member, a drive pinion adapted to engage with and drive said engine member, said pinion having a slotted extension, a shaft on which said pinion is mounted for limited rotary and axial movement, a pin fixed to said shaft and adapted to cooperate rigidly with the slot in the pinion extension for moving the pinion into and out of engagement with said engine member, said pin and slot forming the only driving connection between the slotted extension and shaft, said slot having one contacting wall inclined generally in the direction of normal shaft rotation and provided with a variable curvature which is maximum intermediate the extreme contacting positions of said wall and pin and a second straight contacting wall, said pin being adapted to contact with the curved slot wall in the engaging movement and with the straight slot wall in the disengaging movement.

4. In a starting mechanism for engines, the combination of an engine member, a drive pinion adapted to engage with and drive said engine member, said pinion having a slotted extension, a shaft on which said pinion is mounted for limited rotary and axial movement, a pin fixed to said shaft and adapted to cooperate with the slot in the pinion extension for moving the pinion into and out of engagement with said engine member, said pin and slot forming the only driving connection between the slotted extension and shaft, said slot having one curved contacting wall whose curvature is minimum at the end limits of the slot and maximum at a point adjacent the end limit of the slot corresponding to engaged position of engine member and pinion and a second straight contacting wall, said pin being adapted to contact with the curved slot wall in the engaging movement and with the straight slot wall in the disengaging movement.

5. In a drive mechanism, the combination of a shaft; a drive pinion axially and rotatably mounted on the shaft; connections intermediate the pinion and shaft; and means associated with said connections forming co-acting camming surfaces adapted to move said pinion axially with a negatively accelerated speed when power is transmitted from the shaft to the pinion and to move said pinion axially with a more uniform speed in the opposite direction when said power is transmitted from the pinion to the shaft, the curvature of said camming surfaces being such as to take up the whole shock of engagement.

6. In a starting mechanism for engines, the combination of an engine member, a slotted drive pinion adapted to engage with and drive said engine member, a shaft on which said pinion is mounted for limited rotary and axial movement, a pin fixed to said shaft and adapted to cooperate with the slot in the pinion for moving the pinion into and out of engagement with said engine member, said slot having a contacting wall inclined generally in the direction of shaft rotation and provided with a variable curvature which is maximum intermediate the extreme contacting positions of said wall and pin, and a straight contacting wall, said pin being adapted to contact with the curved slot wall in the engaging movement and with the straight slot wall in the disengaging movement.

7. In a starting mechanism for engines, the combination of an engine member, a slotted drive pinion adapted to engage with and drive said engine member, a shaft on which said pinion is mounted for limited rotary and axial movement, a pin fixed to said shaft and adapted to cooperate with the slot in the pinion for moving the pinion into and out of engagement with said engine member, said slot having a curved contacting wall whose curvature is minimum at the end limits of the slot and maximum at a point adjacent the end limit of the slot corresponding to engaged position of engine member and pinion, and a second straight contacting wall, said pin being adapted to contact with the curved slot wall in the engaging movement and with the straight slot wall in the disengaging movement.

CARL P. BROCKWAY.